(12) United States Patent
Ogata (10) Patent No.: US 7,377,877 B2
(45) Date of Patent: May 27, 2008

(54) GEAR SHIFT CONTROL APPARATUS FOR A HYBRID VEHICLE

(75) Inventor: Makoto Ogata, Tokyo (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 239 days.

(21) Appl. No.: 11/390,299

(22) Filed: Mar. 28, 2006

(65) Prior Publication Data

US 2006/0217229 A1 Sep. 28, 2006

(30) Foreign Application Priority Data

Mar. 28, 2005 (JP) ............... 2005-092173

(51) Int. Cl.
*B60K 5/08* (2006.01)
(52) U.S. Cl. ............................. 477/3; 477/2
(58) Field of Classification Search ............ 477/2, 477/3
See application file for complete search history.

(56) References Cited

U.S. PATENT DOCUMENTS 6,340,847 B1 * 1/2002 Kawabata et al. ........ 290/40 C
6,430,483 B2 * 8/2002 Takaoka et al. ............. 701/22
6,796,287 B2 * 9/2004 Mogi et al. ................ 123/319
6,915,782 B2 * 7/2005 Hanada et al. ............. 123/399

FOREIGN PATENT DOCUMENTS

JP    05 026335    2/1993

\* cited by examiner

*Primary Examiner*—Ha D. Ho
(74) *Attorney, Agent, or Firm*—Jacobson Holman PLLC (57) ABSTRACT

A gear shift control apparatus for a hybrid vehicle can achieve enhancement of the transmission efficiency and enhancement of the fuel cost without damaging the drivability to the utmost. The gear shift control apparatus for a hybrid vehicle includes an engine, a transmission for changing the speed of rotation of the engine, and a motor for assisting the driving force of the engine. The assist torque maximum value of the motor is set higher when the gear position of the transmission is a predetermined gear position at which the transmission efficiency of the driving force is highest than when the gear position is any other gear position than the predetermined gear position.

5 Claims, 5 Drawing Sheets

UP SHIFT DECISION MAP

FIG. 4

DOWN SHIFT DECISION MAP

FIG. 5

MOTOR ASSIST REGION AT ANY OTHER
THAN DIRECTLY COUPLED GEAR POSITION

FIG. 6

MOTOR ASSIST REGION AT
DIRECTLY COUPLED GEAR POSITION

FIG. 7

GEAR SHIFT CONTROL APPARATUS FOR A HYBRID VEHICLE

BACKGROUND OF THE INVENTION (1) Field of the Invention

This invention relates to a gear shift control apparatus for a hybrid vehicle which includes a motor and an engine.

(2) Description of the Related Art

Generally, an automatic transmission incorporated in an automobile includes a gear shift map in which the vehicle speed and the accelerator opening are used as parameters. Usually, a target gear position is set based on the gear shift map, and the gear position is changed over to the target gear position. On the other hand, in a manual transmission, the driver operates a shift lever of its own will to changeover the gear position.

A technique relating to a gear shift control apparatus for an automatic transmission is disclosed in Japanese Patent Laid-Open No. Hei 5-26335 (hereinafter referred to as Patent Document 1). In particular, according to the technique disclosed in Patent Document 1, an automatic transmission which includes a main transmission section and a sub transmission section and wherein the gear position is changed over such that a low speed gear position is assumed when the sub transmission section is in a directly coupled state whereas a high speed gear position is assumed when the sub transmission section is not in a directly coupled state is configured such that, upon down shifting, the sub transmission section assumes the gear position of the directly coupled state.

According to the technique, the ratio of a period of time within which the sub transmission section assumes the directly coupled state upon down shifting is increased by such control as described above to achieve enhancement of the fuel cost and reduction of gear noise and further achieve enhancement of the durability.

Incidentally, in a transmission, a gear position (directly coupled gear position) at which the transmission gear ratio (output rotational speed/input rotational speed) is 1.0 is the gear position at which the highest transmission efficiency is obtained. Meanwhile, in a transmission which does not have a directly coupled gear position, a gear position at which the transmission gear ratio is nearest to 1.0 is the gear position at which the highest transmission efficiency is obtained. The transmission gear position at which the transmission efficiency is highest provides an advantage that an enhanced fuel cost is obtained when compared with the other gear positions.

However, conventional popular automatic transmissions are not configured taking such a situation as described above into consideration, but a gear shift map is set based on a torque characteristic of a driving source (engine). Accordingly, in conventional popular automatic transmissions, if the engine operation condition is changed to a region of another gear position on the gear shift map, then gear shifting is performed even if traveling at the directly coupled gear position is preferable from the fuel cost performance.

Further, in the technique disclosed in Patent Document 1, while, upon down shifting, the subtransmission section is shifted to the gear position of the directly coupled state, the target gear position of the main transmission section is set based on an ordinary gear shift map. In this regard, the technique disclosed in Patent Document 1 is a similar technique to the popular automatic transmissions described hereinabove and does not take the transmission efficiency at the main transmission section into consideration. Further, with the technique disclosed in Patent Document 1, since the target gear position is likely to be set to a gear position different from an original target gear position, there is the possibility that the drivability may be damaged.

SUMMARY OF THE INVENTION

It is an object of the present invention to provide a gear shift control apparatus for a hybrid vehicle which can achieve further enhancement of the transmission efficiency and further enhancement of the fuel cost without damaging the drivability to the utmost.

In order to attain the object described above, according to the present invention, there is provided a gear shift control apparatus for a hybrid vehicle, comprising an engine mounted on the vehicle, a transmission for changing the speed of rotation of the engine, and a motor for assisting the driving force of the engine, an assist torque maximum value of the motor for assisting the engine being set higher when the gear position of the transmission is a predetermined gear position at which the transmission efficiency of the driving force is highest than when the gear position is any other gear position than the predetermined gear position.

Preferably, the gear shift control apparatus for a hybrid vehicle further comprises gear position changeover means for changing over the gear position of the transmission based on a first parameter relating to a driving force requirement of a driver and a second parameter relating to the speed of rotation of a driving source formed from the engine and the motor, the gear position changeover means using either a threshold value for the first parameter which is set lower when the gear position of the transmission is down shifted from the predetermined position than when the gear position of the transmission is down shifted from any other gear position than the predetermined gear position or a threshold value for the second parameter which is set lower when the gear position of the transmission is down shifted from the predetermined position than when the gear position of the transmission is down shifted from any other gear position than the predetermined gear position.

Preferably, the gear shift control apparatus for a hybrid vehicle further comprises gear position changeover means for changing over the gear position of the transmission based on a first parameter relating to a driving force requirement of a driver and a second parameter relating to the speed of rotation of a driving source formed from the engine and the motor, the gear position changeover means using either a threshold value for the first parameter which is set higher when the gear position of the transmission is up shifted to the predetermined position than when the gear position of the transmission is up shifted to any other gear position than the predetermined gear position or a threshold value for the second parameter which is set lower when the gear position of the transmission is up shifted to the predetermined position than when the gear position of the transmission is up shifted to any other gear position than the predetermined gear position.

Preferably, the motor is connected to a rechargeable and dischargeable battery through an inverter, and a clutch and the motor are interposed in order from the engine side between the engine and the transmission.

Preferably, the motor is connected to a rechargeable and dischargeable battery through an inverter, and the motor and a clutch are interposed in order from the engine side between the engine and the transmission.

With the gear shift control apparatus for a hybrid vehicle, even if the gear position at which the transmission efficiency of the driving force is highest is a comparatively high-speed gear position, a sufficient acceleration performance can be exhibited and the drivability is enhanced. Therefore, the driver is less likely to feel shortage of the torque at the gear position at which the efficiency is highest, and consequently, the frequency in use of the gear position at which the efficiency is highest increases, resulting in enhancement of the fuel cost. Further, since the assist torque maximum value is set to a high value only at the gear position at which the efficiency is highest, there is an advantage that increase of the battery power consumption by an increase of the assist torque can be minimized.

Further, since down shifting from the gear position (predetermined gear position) at which the transmission efficiency of the driving force is highest to another gear position and up shifting from another gear position to the predetermined gear position are suppressed, the frequency in use of the predetermined gear position enhances, and the power transmission efficiency of the entire transmission is improved. Consequently, there is an advantage that the fuel cost and the emission (exhaust gas purification performance) are enhanced.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
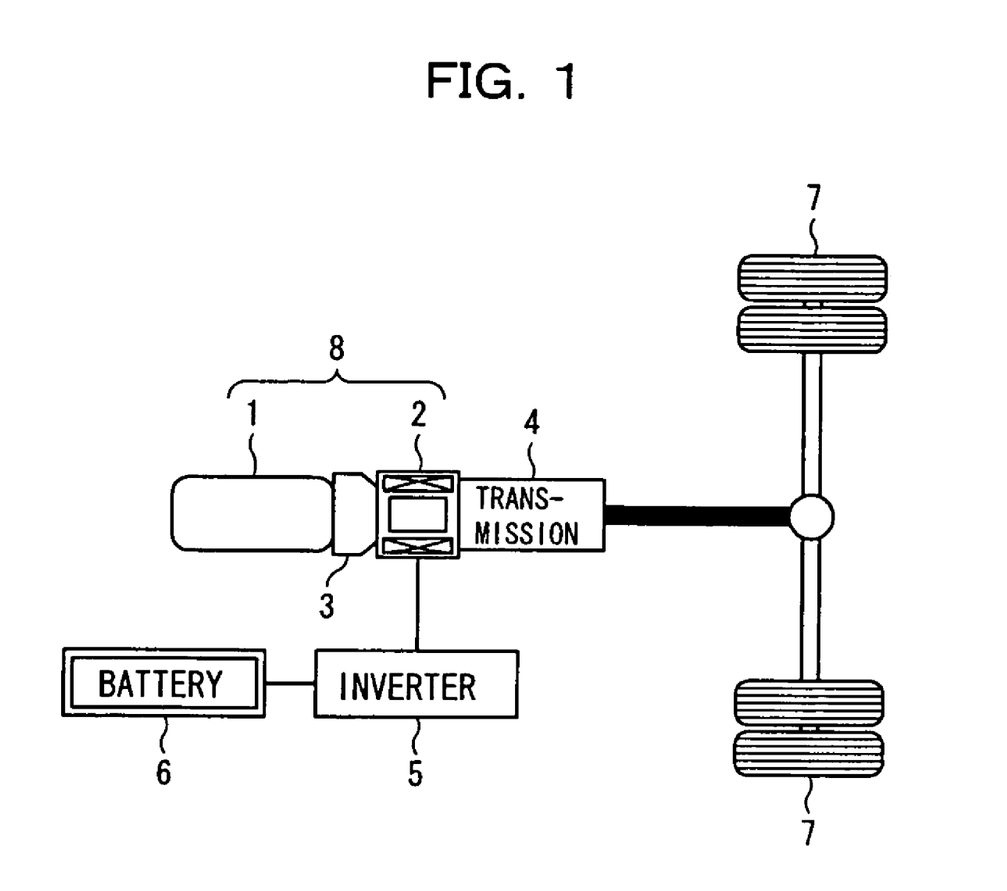
FIG. 1 is a schematic view showing a power train of a vehicle to which a gear shift control apparatus for a hybrid vehicle according to an embodiment of the present invention is applied.

In the following, a gear shift control apparatus for a hybrid vehicle according to an embodiment of the present invention is described with reference to the drawings. Referring first to FIG. 1, the vehicle shown is a parallel hybrid automobile (HEV) which uses an engine 1 and an electric motor (or motor/generator; hereinafter referred to simply as motor) 2 as a driving source 8. The vehicle is driven with total output power of the engine 1 and the motor 2.

A clutch 3 is interposed between the engine 1 and the motor 2 such that it can connect and disconnect the driving force between the engine 1 and the motor 2. A transmission 4 for changing the output rotational speed of the engine 1 and/or the motor 2 is provided on the output side of the motor 2. In short, in the vehicle, the engine 1, clutch 3, motor 2 and transmission 4 are disposed in series in this order. The driving force outputted from the transmission 4 is transmitted to driving wheels 7.

A rechargeable and dischargeable battery 6 is connected to the motor 2 through an inverter 5 such that the operation condition of the motor 2 is controlled by control of operation of the inverter 5.

According to the configuration described, by connecting the clutch 3 and driving the motor 2, the vehicle can travel while the driving force of the engine 1 is assisted by the driving force of the motor 2. Further, by operating the inverter 5 so as to cause the motor 2 to function as a generator, it is possible for the motor 2 to generate electric power with the driving force of the engine 1 to charge the battery 6 or to cause a regeneration brake to act to regenerate the electric power. It is to be noted that also it is possible to use only the driving force of the motor 2 to drive the driving wheels 7 if the motor 2 receives supply of electric power from the battery 6 to perform power running with the clutch 3 held in a disconnected state.

Incidentally, in the present embodiment, an automatic transmission is applied as the transmission 4. The automatic transmission 4 is of the staged type wherein the gear position at present is changed over so as to coincide with a target gear position set based on a shift map hereinafter described. Particularly, the transmission 4 here is formed as an automatic transmission which is based on a manual transmission of the parallel biaxial gear type and changes over the gear position by rendering a plurality of actuators not shown operative.

Therefore, the transmission 4 is additionally provided with a gear shift unit (GSU) 9 (refer to FIG. 2) which has the above-mentioned actuators not shown. It is to be noted that, for the transmission, not only such a transmission as described above but also an automatic transmission which includes a torque converter and a planetary gear mechanism in combination may be used, and also a transmission of any other type may be used.

Further, the clutch 3 is an automatic clutch which is automatically connected and disconnected upon changeover of the gear position, and the connection and disconnection of the clutch 3 is executed by causing a clutch actuator not shown either to operate in cooperation with the GSU 9. It is to be noted that, where an automatic transmission having a torque converter is applied to the motor 2, the clutch 3 can be omitted.

Figure 2:
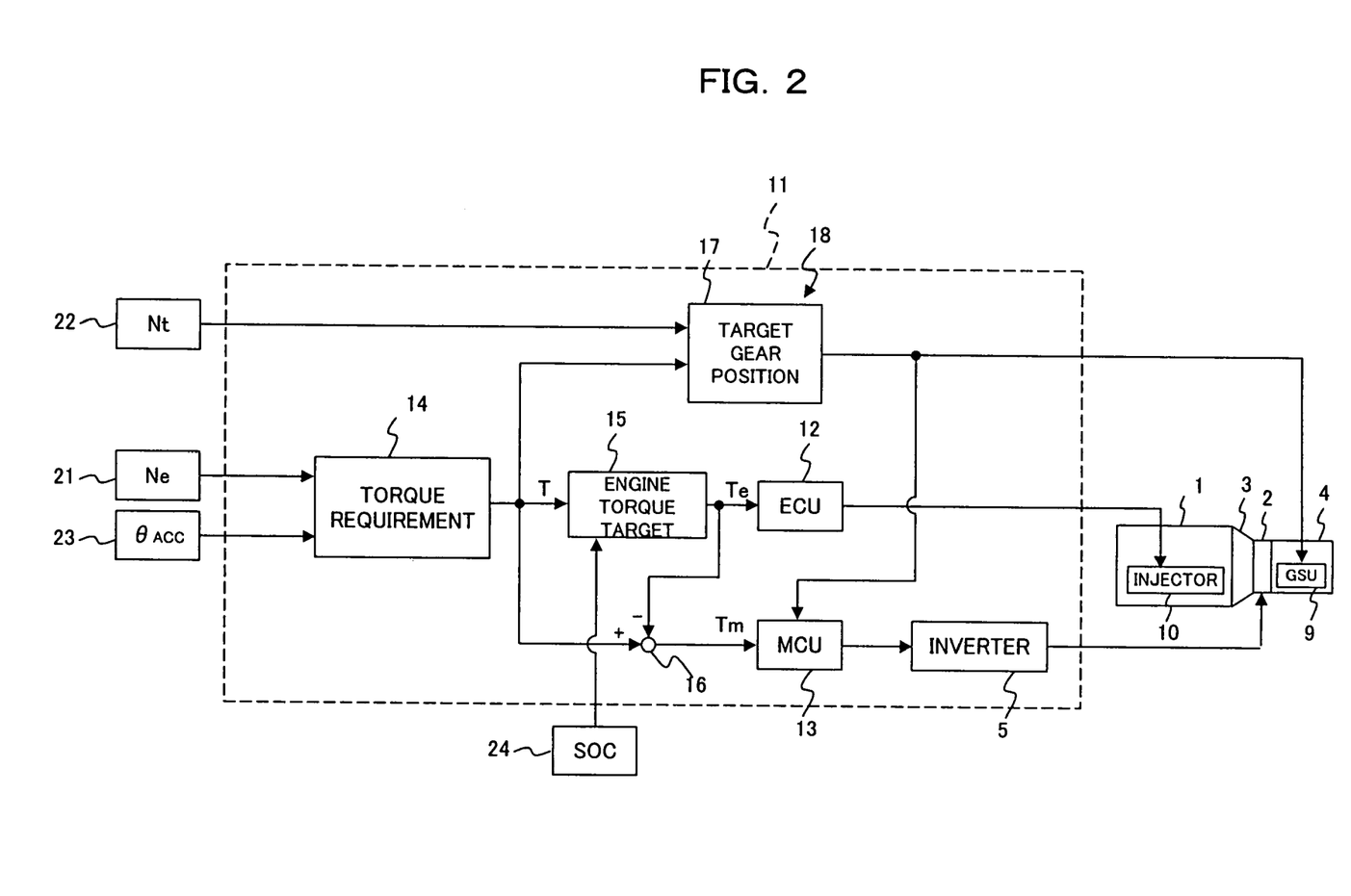
FIG. 2 is a block diagram showing functions of the gear shift control apparatus for a hybrid vehicle.

Further, in the present embodiment, the engine 1 is formed as a Diesel engine, and the output torque of the engine 1 is controlled by controlling the driving period of time (that is, fuel injection amount) of an injector 10 (refer to FIG. 2). It is to be noted that a gasoline engine may be applied otherwise as the engine, and in this instance, the output torque of the engine is controlled by adjusting the throttle opening.

Now, principal components of the gear shift control apparatus for a hybrid vehicle according to the present invention are described with reference to FIG. 2. The vehicle shown includes system management means (system management unit) 11 for generally managing and controlling the hybrid system. The system management means 11 includes an engine control unit (ECU) 12 for controlling operation principally of the injector 10, a motor control unit (MCU) 13 for controlling the operation condition of the inverter 5, and a transmission controller 17 for setting a target gear position of the transmission 4 and controlling operation of the GSU 9. It is to be noted here that gear position changeover means 18 is composed of the transmission controller 17 and the GSU 9. Further, though not shown, also a clutch controller for cooperating with the transmission controller 17 to control the connection/disconnection condition of the clutch 3 is provided.

An engine speed sensor 21 for detecting an engine speed Ne of the engine 1, a input shaft speed sensor 22 for detecting a rotational speed Nt of an input power shaft of the transmission 4 (output side rotational speed of the clutch 3), an accelerator opening sensor 23 for detecting an accelerator operation amount (accelerator opening) $\theta_{ACC}$ by the driver, and a remaining capacity sensor 24 for detecting the remaining capacity (SOC) of the battery 6 are connected to the system management means 11.

Further, as seen in FIG. 2, the system management means 11 includes torque requirement calculation means 14 for calculating a torque requirement for the driving source 8 based on a traveling condition of the vehicle and a driving operation condition of the driver, an engine target torque setting means 15 for setting an output torque to be taken charge of by the engine 1 from within the torque requirement for the driving source 8 calculated by the torque requirement calculation means 14, and motor target torque setting means 16 for setting an output torque to be taken charge of by the motor 2.

As seen in FIG. 2, the engine speed Ne and the accelerator opening $\theta_{ACC}$ detected by the engine speed sensor 21 and the accelerator opening sensor 23, respectively, are inputted to the torque requirement calculation means 14. Thus, the torque requirement calculation means 14 calculates a total torque T, which the driver is to request to the driving source 8 composed of the engine 1 and the motor 2, based on the information (Ne and $\theta_{ACC}$) inputted thereto.

Further, the remaining capacity sensor 24 for calculating the remaining capacity SOC of the battery based on the battery voltage and battery current is connected to the engine target torque setting means 15. The engine target torque setting means 15 includes a map in which the remaining capacity SOC obtained by the remaining capacity sensor 24 and the total torque T set by the torque requirement calculation means 14 are used as parameters and sets an engine target torque Te based on the total torque T and the remaining capacity SOC. In particular, the ratio between the torques to be taken charge of by the engine 1 and the motor 2 is set in the map. The ratio between the torques is set to such a characteristic that, as the remaining capacity SOC decreases, the ratio of the torque to be taken charge of by the engine 1 increases (that is, the ratio of the torque to be taken charge of by the motor decreases). The ratio between the torques may be set otherwise such that, for example, where the total torque T is lower than an engine maximum torque, the engine 1 takes charge of the 100% driving torque, but where the total torque T exceeds the engine maximum torque, the amount of the torque by which the engine maximum torque is exceeded is assisted by the transmission 4.

When the engine target torque Te is set in this manner, a traveling torque (motor target torque) TM to be taken charge of by the motor 2 is calculated by subtracting the engine target torque Te from the torque requirement T calculated by the torque requirement calculation means 14. It is to be noted that, in FIG. 2, the operator 16 functions as motor target torque setting means.

Further, the engine target torque Te may be set otherwise such that, for example, a value obtained by subtracting a motor target torque from a total torque requirement is set as an engine target torque, or an engine target torque higher than a total torque requirement is set in response to a state of the SOC such that the vehicle travels while electric power is generated. Thus, for the torque distribution, various techniques can be applied.

Then, after the engine target torque Te and the motor target torque Tm are set in such a manner as described above, the engine target torque Te is inputted to the ECU 12, and the ECU 12 sets (or calculates) an injector driving time period required to output the engine target torque Te. Consequently, the injector 10 is driven for the input driving time period set by the ECU 12 and controls the engine 1 so that the engine output torque may become equal to the engine target torque Te.

On the other hand, after the motor target torque Tm is set, the motor target torque Tm is inputted to the MCU 13, by which the operation of the inverter 5 is controlled so that the motor target torque Tm maybe obtained. Consequently, the motor 2 is controlled so that the motor output torque becomes equal to the motor target torque Tm.

Further, the system management means 11 includes the transmission controller 17 as described hereinabove. The transmission controller 17 in turn includes a target gear position setting map for setting a target gear position using a rotational speed Nt (second parameter) of the input power shaft of the transmission 4 detected by the input shaft speed sensor 22 and the total torque requirement (first parameter) T for the driving source 8 calculated by the torque requirement calculation means 14 as parameters.

Figure 3:
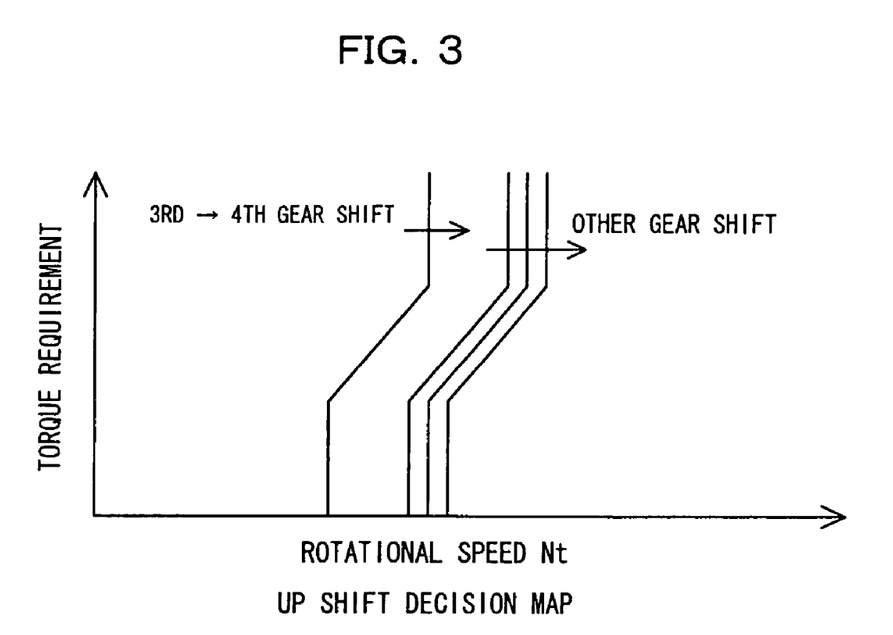
FIG. 3 is an up shift diagram of the gear shift control apparatus for a hybrid vehicle.
Figure 4:
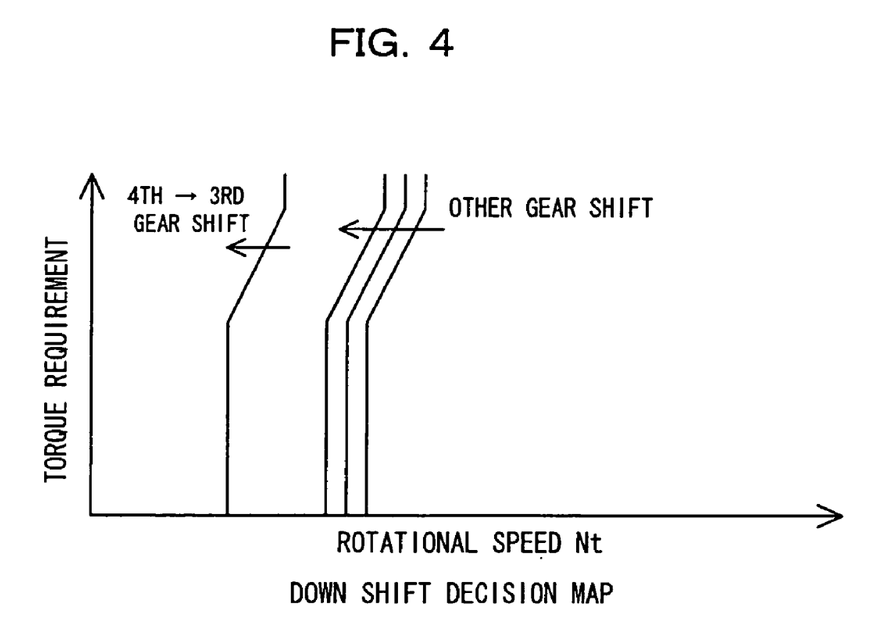
FIG. 4 is a down shift diagram of the gear shift control apparatus for a hybrid vehicle.

The target gear position setting map in turn includes an up shift target gear position map illustrated in FIG. 3 and a down shift target gear position map illustrated in FIG. 4.

If the operation condition of the vehicle crosses one of characteristic curves of the map shown in FIG. 3 or 4, then the operation of the actuator for the clutch 3 is controlled by the clutch controller not shown to disconnect the clutch 3, and the operation of the gear shift unit 9 is controlled by the transmission controller 17 to changeover the gear position.

Incidentally, in the present embodiment, the transmission has five gear positions from the first gear position to the fifth gear position, and the transmission gear ratio of the transmission is set so as to successively decrease from the first to fifth gear position. In the present embodiment, the fourth gear position from among the first to fifth gear positions is the directly coupled gear position at which the transmission gear ratio is 1.00 and is a gear position (predetermined gear position) at which the transmission efficiency is highest. It is to be noted that the fifth gear position is an overdrive gear position at which the transmission gear ratio is lower than 1.00.

Then, in the present embodiment, with attention paid to the fact that the transmission efficiency is highest at the directly coupled gear position, in order to increase the frequency in use of the directly coupled gear position to the utmost, a target gear position setting map for the transmission controller 17 is set. In particular, as seen from FIG. 3, only the up shift characteristic line from the third gear position to the fourth gear position (directly coupled gear position) is set to the low rotation side by a greater amount when compared with the other up shift characteristic lines. In other words, the threshold value for the rotational speed Nt of the transmission 4 upon up shifting of the gear position to the directly coupled gear position is set lower than those for the rotational speed Nt of the transmission 4 upon up shifting from any other gear position than the directly coupled gear position.

Meanwhile, as seen in FIG. 4, the down shift characteristic line from the directly coupled gear position is set by a greater amount to the low rotation side with respect to the other down shift characteristic lines. In other words, the threshold value for the rotational speed Nt upon down shifting of the gear position from the directly coupled gear position to another gear position (here, the third gear position) is set lower than those for the rotational speed Nt upon down shifting from any other gear position than the directly coupled gear position.

It is to be noted that, as seen in FIG. 3, the other up shift characteristic lines than the up shift characteristic line to the directly coupled gear position are set to similar characteristics to each other. In particular, the up shift characteristic lines from the first gear position to the second gear position, from the second gear position to the third gear position and from the fourth gear position to the fifth gear position are set to substantially same rotational speeds to each other. Similarly, also the other down shift characteristic lines than the down shift characteristic line from the directly coupled gear position (down shift characteristic lines from the fifth gear position to the fourth gear position, from the third gear position to the second gear position and from the second gear position to the first gear position) are set to substantially same rotational speeds to each other as seen in FIG. 4.

Then, where the up shift characteristic lines and the down shift characteristic lines are set in this manner, since up shifting to the directly coupled gear position (fourth gear position) is performed in a lower rotational speed region than that upon a gear shift to any other gear position, the frequency in up shifting to the directly coupled gear position increases. Further, since down shifting from the directly coupled gear position (fourth gear position) is not executed unless the rotational speed Nt drops to a lower rotational speed region than that upon a gear shift from any other gear position, the frequency in down shifting to the third gear position decreases conversely and the frequency in which the directly coupled gear position is used increases.

In this manner, in the transmission controller 17, since the upshift line to the directly coupled gear position and the down shift line from the directly coupled gear position are set to the lower rotation side than the other shift lines, the frequency in which the directly coupled gear position is used increases and reduction of the loss of the transmission efficiency of the transmission 4 is achieved thereby. As a result, the fuel cost is enhanced and also the exhaust gas performance is enhanced. It is to be noted that, as a method of expanding the operation region at the directly coupled gear position, the characteristic of the up shift line to the directly coupled gear position may be set to the lower torque requirement side than to the other gear positions, or the characteristic of the down shift line from the directly coupled gear position may be set to the lower torque requirement side than those from any other gear position. In short, the characteristic of the up shift line to the directly coupled gear position may be set such that the gear position is up shifted to the directly coupled gear position with a total torque requirement (first parameter) lower than those to the other gear positions, or the characteristic of the down shift line from the directly coupled gear position maybe set such that down shifting from the directly coupled gear position is not accepted until the total torque requirement becomes lower than that upon down shifting to any other gear position.

Incidentally, in such shift characteristics as described above with reference to FIGS. 3 and 4, although the frequency in which the directly coupled gear position is used on the lower rotational side than those in popular transmissions (or conventional transmissions), since the output torque of the engine 1 decreases in a low rotation region, the driving torque in a low rotation region at the directly coupled gear position decreases.

Figure 5:
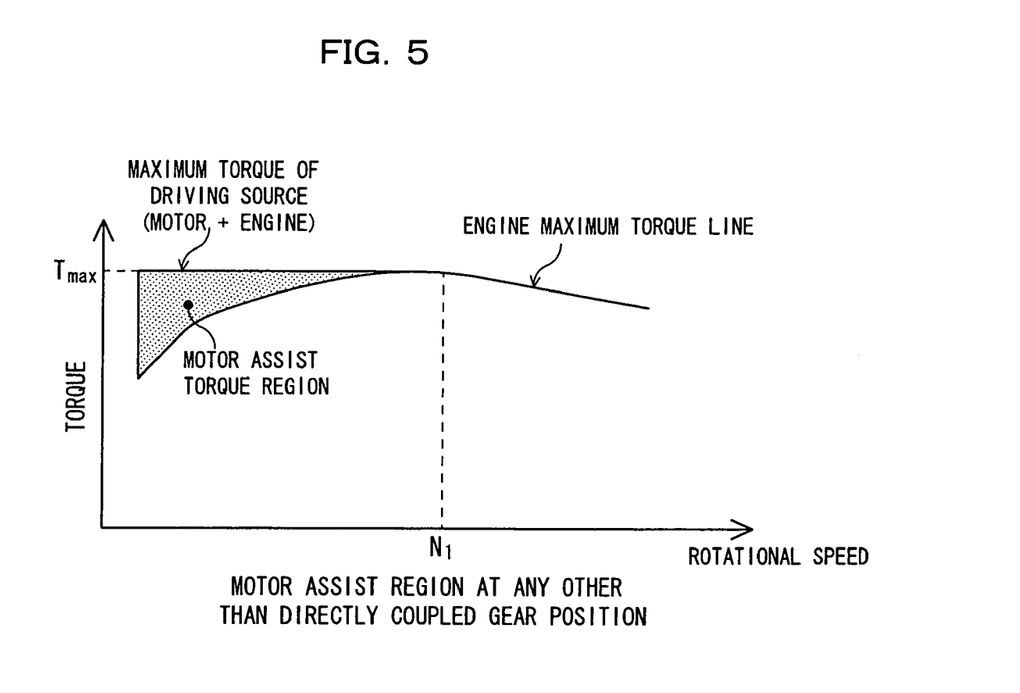
FIG. 5 is a diagram illustrating an action of the gear shift control apparatus for a hybrid vehicle and illustrating a torque characteristic of a driving source at a gear position other than a directly coupled gear position.
Figure 6:
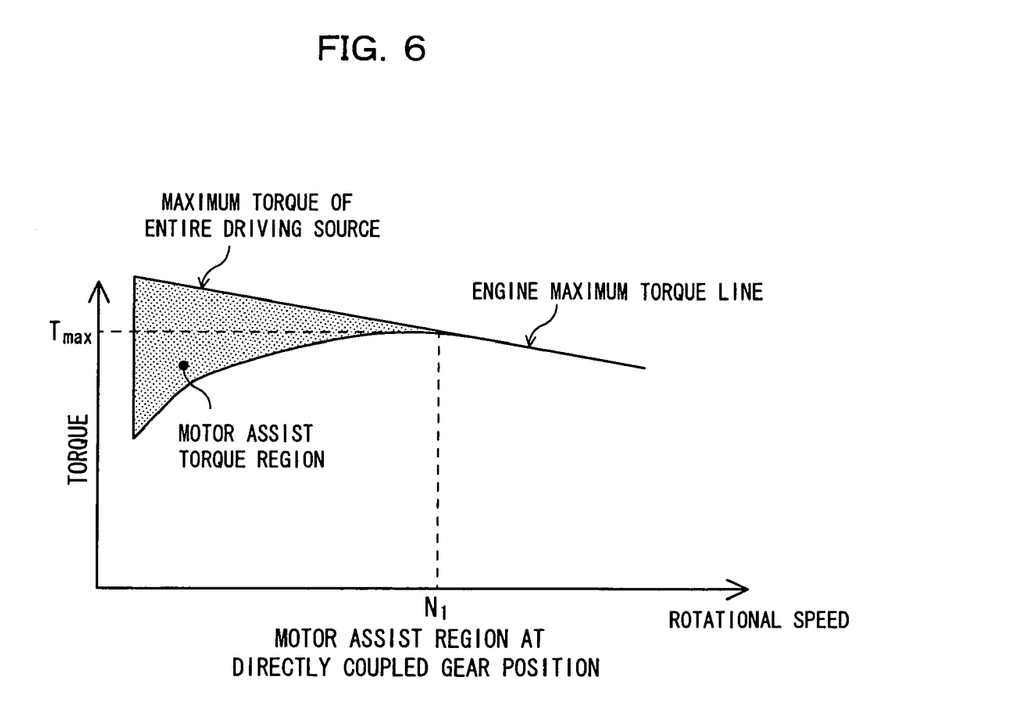
FIG. 6 is a similar view but illustrating a torque characteristic of the driving source at the directly coupled gear position.

Therefore, in the present embodiment, when the transmission 4 is at the directly coupled gear position, the maximum driving torque of the motor 2 (maximum value of the assist torque) is set to a high value. In particular, the MCU 13 includes such maps as shown in FIGS. 5 and 6. Both of the maps illustrate output regions of the assist torque by the motor 2. In particular, FIG. 5 illustrates a motor assist region at any other gear position than the directly coupled gear position, and FIG. 6 illustrates a motor assist region at the directly coupled gear position.

Detailed description is given below. In particular, when a target gear position is set by the transmission controller 17, the MCU 13 fetches the information and changes the output characteristic of the motor 2 only when the target gear position is the directly coupled gear position. Further, as seen from FIGS. 5 and 6, when the target gear position is the directly coupled gear position, the maximum value of the assist torque of the motor 2 (a line which defines an upper limit to the motor assist region illustrated in FIGS. 5 and 6) is set higher than that at any other gear position than the directly coupled gear position.

Here, at any other gear position than the directly coupled gear position, the assist torque maximum value of the motor 2 is set that the motor 2 outputs an assist torque in a rotation region lower than a rotational speed $N_1$ at which the engine 1 generates the engine maximum torque Tmax. More particularly, the maximum torque of the motor 2 is set such that the total maximum torque of the motor 2 and the engine 1 substantially coincides with the engine maximum torque Tmax. Consequently, a drop of the torque upon low speed rotation of the engine 1 is compensated for by the assist torque of the motor 2 thereby to assure the engine maximum torque Tmax of the driving source 8 in the entire rotation region lower than the rotational speed $N_1$.

In contrast, at the directly coupled gear position, an assist torque region of the motor 2 is set to the low rotation region side than the rotational speed $N_1$ at which the engine 1 generates the engine maximum torque Tmax as seen in FIG. 6 similarly as at any other gear position than the directly coupled gear position. However, the maximum torque which can be outputted from the entire driving source 8 is set such that, at the directly coupled gear position, it increases as the speed of rotation decreases.

It is to be noted that, while, in FIG. 6, that the maximum torque of the driving source 8 is set to such a characteristic that it increases more linearly as the speed of rotation decreases, the engine maximum torque is not limited to the specific characteristic, but only it is necessary that the torque characteristic of the entire driving source 8 be set at least to a value higher than the maximum torque characteristic at any other gear position than the directly coupled gear position illustrated in FIG. 5.

Further, also it is possible to set the maximum torque characteristic of the motor 2 to a still higher value. However, if the maximum torque which can be outputted from the motor 2 is set to an excessively high value, then although the output power of the driving source 8 enhances, the remaining capacity SOC decreases earlier, which may rather result in degradation of the fuel cost. Accordingly, the maximum torque characteristic of the motor 2 at the directly coupled gear position is preferably set to such a torque characteristic that acceleration similar to that in a conventional vehicle is obtained when the directly coupled gear position is used in a rotation region lower than an ordinary rotation region.

Since the gear shift control apparatus for a hybrid vehicle according to the embodiment of the present invention is configured in such a manner as described above, the following action and advantages are achieved.

First, the torque requirement calculation means 14 fetches the engine speed Ne and the accelerator opening $\theta_{ACC}$ from the engine speed sensor 21 and the accelerator opening sensor 23, respectively, and calculates a torque requirement for the driving source 8 from the thus fetched parameters. Then, after the torque requirement is calculated, a sharing ratio of the torque requirement between the engine 1 and the motor 2 is set in response to the remaining capacity SOC of the battery 6 obtained by the remaining capacity sensor 24, and target torques for the engine 1 and the motor 2 are set individually.

Meanwhile, the transmission controller 17 sets a target gear position using the torque requirement for the driving source 8 and the rotational speed Nt obtained by the input shaft speed sensor 22 as parameters. Here, upon up shifting, the target speed gear is determined depending upon the gear shift map shown in FIG. 3, but upon down shifting, the target speed gear is determined depending upon the gear shift map shown in FIG. 4. However, in the gear shift maps, the up shift line to the directly coupled gear position and the down shift line from the directly coupled gear position are set to the lower rotation side with respect to the other shift lines so that the operation region at the directly coupled gear position may be expanded.

Consequently, since up shifting to the directly coupled gear position is performed in a region of lower rotation when compared with that upon gear shift to any other gear position, the frequency in up shifting to the directly coupled gear position increases. Further, since down shifting from the directly coupled gear position is not executed unless the rotational speed Nt drops to a lower rotation region than that upon gear shift from any other gear position, the frequency in down shifting to the third gear position decreases conversely, and the frequency in use of the directly coupled gear position still increases.

Consequently, down shifting or up shifting from the directly coupled gear position, which is a gear position at which the transmission efficiency of the driving force is highest, to any other gear position is suppressed, and the frequency in use of the directly coupled gear position enhances. Consequently, the power transmission efficiency of the entire transmission enhances. Further, since the power transmission efficiency enhances in this manner, there is an advantage that the fuel cost and the exhaust gas purification performance are enhanced.

Further, when the transmission 4 is at the directly coupled gear position, the maximum driving torque of the motor 2 is set higher than that at any other non-directly coupled gear position, and consequently, the amount of engine torque by which the engine torque drops in an engine low rotation region is compensated for. As a result, shortage in torque when the directly coupled gear position is used in the low rotation region is eliminated, and the drivability is enhanced.

Further, since the acceleration performance at the gear position (directly coupled gear position) at which the efficiency is highest increases, such a driving operation of the driver as to operate the accelerator pedal because the driver feels shortage of the driving torque, that is, such a driving operation as to down shift the gear position from the gear position at which the efficiency is highest to any other gear position positively, is suppressed. Accordingly, also from this point, the frequency in use of the directly coupled gear position enhances, and the power transmission efficiency further enhances.

Further, since the maximum driving torque of the motor 2 is set to a high value only at the directly coupled gear position as described hereinabove, the increase of the battery power consumption by an increase of the assist torque of the motor 2 can be minimized. Consequently, there is an advantage that such a situation that the battery is used up can be eliminated.

It is to be noted that the present invention is not limited to the embodiment specifically described above, and various variations and modifications can be made without departing from the scope of the present invention. For example, while, in the present embodiment, the directly coupled gear position (gear ratio: 1.00) is applied as a gear position at which the transmission efficiency is highest, the present invention can be applied also to another transmission which does not have the directly coupled gear position. In this instance, the gear position (predetermined position) at which the transmission efficiency is highest is given by a gear position at which the gear ratio is nearest to 1.00.

Further, while, in the present embodiment, the total torque T required for the driving source is used as the first parameter, other various parameters can be applied only if they correspond to the engine load. For example, the first parameter may be an accelerator operation amount, or where the engine 1 is a gasoline engine, a throttle opening may be applied. On the other hand, while the rotational speed Nt of the transmission 4 is uses as the second parameter, the vehicle speed may be used instead. It is to be noted that, since the vehicle speed can be determined uniquely from the gear ratio and the dynamic radius of a tyre, the rotational speed Nt and the vehicle speed are equivalent to each other.

Figure 7:
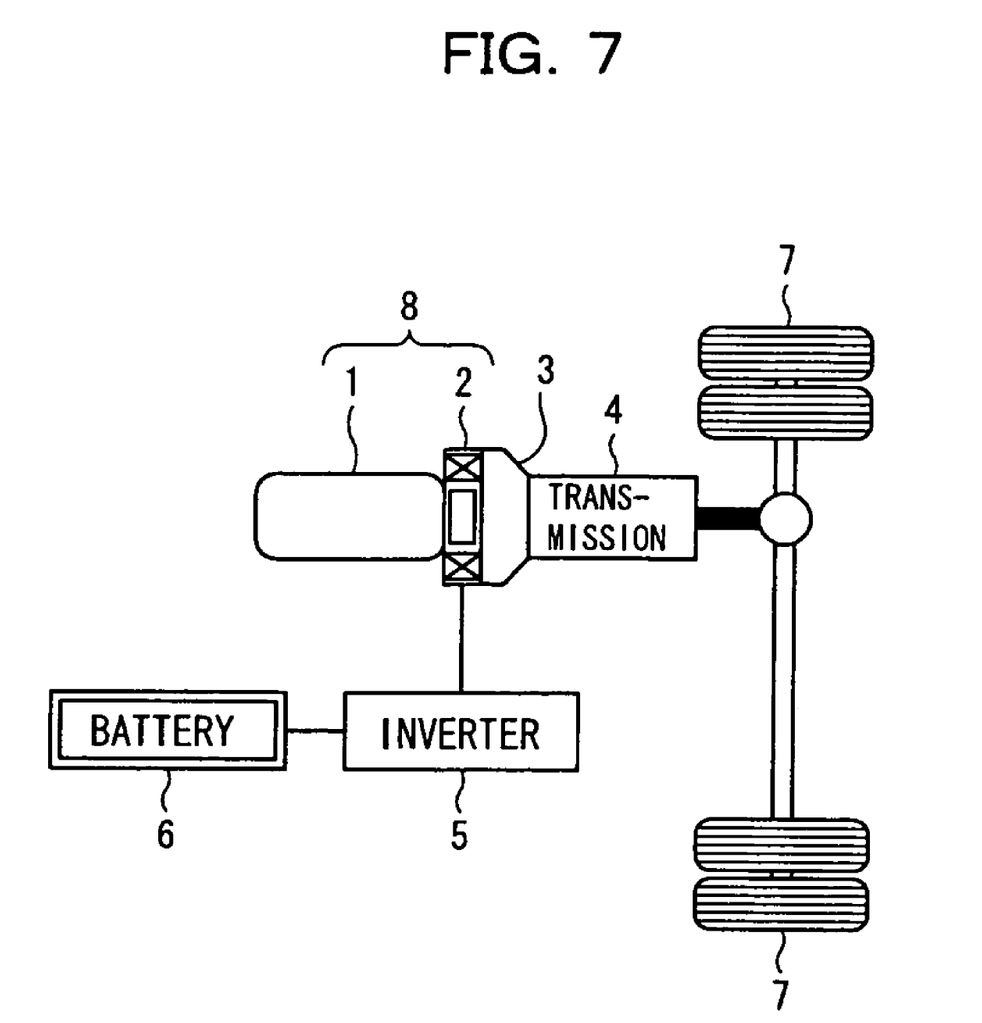
FIG. 7 is a schematic view showing a modification to the gear shift control apparatus for a hybrid vehicle.

Further, the present invention is applied not only to such a hybrid automobile as shown in FIG. 1, but may be applied, for example, to such a hybrid automobile as shown in FIG. 7 wherein an engine 1 and a motor 2 are provided adjacent each other and a clutch 3 is interposed between the motor 2 and the transmission 4.

Further, the present invention may be applied not only to automatic transmissions but also to manual transmissions.

What is claimed is:

1. A gear shift control apparatus for a hybrid vehicle, comprising:
    an engine mounted on said vehicle;
    a transmission for changing the speed of rotation of said engine; and
    a motor for assisting the driving force of said engine;
    an assist torque maximum value of said motor for assisting said engine being set higher when the gear position of said transmission is a predetermined gear position at which the transmission efficiency of the driving force is highest than when the gear position is any other gear position than the predetermined gear position.

2. The gear shift control apparatus for a hybrid vehicle as claimed in claim 1, further comprising gear position changeover means for changing over the gear position of said transmission based on a first parameter relating to a driving force requirement of a driver and a second parameter relating to the speed of rotation of a driving source formed from said engine and said motor,
    said gear position changeover means using either a threshold value for the first parameter which is set lower when the gear position of said transmission is down shifted from the predetermined position than when the gear position of said transmission is down shifted from any other gear position than the predetermined gear position or a threshold value for the second parameter which is set lower when the gear position of said transmission is down shifted from the predetermined position than when the gear position of said transmission is down shifted from any other gear position than the predetermined gear position.

3. The gear shift control apparatus for a hybrid vehicle as claimed in claim 1, further comprising gear position changeover means for changing over the gear position of said transmission based on a first parameter relating to a driving force requirement of a driver and a second parameter relating to the speed of rotation of a driving source formed from said engine and said motor, said gear position changeover means using either a threshold value for the first parameter which is set lower when the gear position of said transmission is up shifted to the predetermined position than when the gear position of said transmission is up shifted to any other gear position than the predetermined gear position or a threshold value for the second parameter which is set lower when the gear position of said transmission is up shifted to the predetermined position than when the gear position of said transmission is up shifted to any other gear position than the predetermined gear position.

4. A gear shift control apparatus for a hybrid vehicle as claimed in claim 1, wherein said motor is connected to a rechargeable and dischargeable battery through an inverter, and a clutch and said motor are interposed in order from said engine side between said engine and said transmission.

5. A gear shift control apparatus for a hybrid vehicle as claimed in claim 1, wherein said motor is connected to a rechargeable and dischargeable battery through an inverter, and said motor and a clutch are interposed in order from said engine side between said engine and said transmission.

* * * * *